US012340662B2

(12) United States Patent
Marsh et al.

(10) Patent No.: US 12,340,662 B2
(45) Date of Patent: Jun. 24, 2025

(54) SYSTEMS AND METHODS FOR CONSOLIDATING SYMBOLS IN ELECTRONIC GAMING

(71) Applicant: Aristocrat Technologies, Inc., Las Vegas, NV (US)

(72) Inventors: David Marsh, Charlottesville, VA (US); Karl Roelofs, Charlottesville, VA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 294 days.

(21) Appl. No.: 17/956,339

(22) Filed: Sep. 29, 2022

(65) Prior Publication Data

US 2024/0112540 A1 Apr. 4, 2024

(51) Int. Cl.
*G07F 17/32* (2006.01)
*G07F 17/34* (2006.01)

(52) U.S. Cl.
CPC .......... *G07F 17/3267* (2013.01); *G07F 17/34* (2013.01)

(58) Field of Classification Search
CPC ........................................................ G07F 17/32
See application file for complete search history.

(56) References Cited

U.S. PATENT DOCUMENTS 7,824,260 B2 * 11/2010 Aida .................. G07F 17/3213 463/19
8,357,041 B1 * 1/2013 Saunders ................ G07F 17/32 463/19
2003/0203753 A1 * 10/2003 Muir ....................... G07F 17/32 463/20
2005/0009596 A1 * 1/2005 Daly ................... G07F 17/3262 463/20
2007/0060248 A1 3/2007 Rodgers
2009/0170590 A1 7/2009 Thomas
2014/0162756 A1 * 6/2014 Rodgers .............. G07F 17/3216 463/20
2014/0248933 A1 * 9/2014 Berman ................ G07F 17/326 463/13
2015/0080089 A1 * 3/2015 Saunders ............ G07F 17/3213 463/20
2016/0125687 A1 * 5/2016 Berman ................ G07F 17/326 463/21
2016/0343198 A1 * 11/2016 Karra .................. G07F 17/3225
(Continued)

*Primary Examiner* — Omkar A Deodhar
(74) *Attorney, Agent, or Firm* — Armstrong Teasdale LLP

(57) ABSTRACT

An electronic gaming device including a display device, a memory device storing instructions, and a processor in communication with the display device and the memory device is described. The instructions, when executed by the processor, cause the processor to cause display of a plurality of symbols, present an output amount, determine that the plurality of symbols includes a plurality of consolidating symbols, cause display of the plurality of consolidating symbols consolidating into a consolidated symbol, fill any vacant symbol positions with new symbols, determine a second output amount, and present the second output amount. The instructions also cause the processor to cause display of a third plurality of symbols, the third plurality of symbols and the consolidated symbol defining a fourth plurality of symbols, determine a third output amount based upon the fourth plurality of symbols, and present the third output amount.

20 Claims, 13 Drawing Sheets

(56) References Cited

U.S. PATENT DOCUMENTS

| | | | | |
|---|---|---|---|---|
| 2018/0012447 | A1 | 1/2018 | Rodgers | |
| 2018/0061186 | A1 | 3/2018 | Berman | |
| 2018/0130287 | A1* | 5/2018 | Berman | G07F 17/3213 |
| 2020/0219357 | A1* | 7/2020 | Kania | G07F 17/3213 |

* cited by examiner

SYSTEMS AND METHODS FOR CONSOLIDATING SYMBOLS IN ELECTRONIC GAMING

TECHNICAL FIELD

The field of disclosure relates generally to electronic gaming, and more specifically, to systems and methods for consolidating symbols in electronic gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is described. The electronic gaming device includes a display device, a memory device storing instructions, and a processor in communication with the display device and the memory device. The instructions, when executed by the processor, cause the processor to cause display of a plurality of symbols at a plurality of symbol positions on the display device wherein the plurality of symbols correspond to an output amount for a play of an electronic game, present the output amount for the play of the electronic game, and determine that the plurality of symbols includes a plurality of consolidating symbols. The instructions also cause the processor to cause display of the plurality of consolidating symbols consolidating into a consolidated symbol at a symbol position of the plurality of symbol positions previously occupied by a consolidating symbol wherein the consolidated symbol is associated with a number of future plays of the electronic game, fill any vacant symbol positions of the plurality of symbol positions with new symbols wherein the new symbols, the consolidated symbol, and any remaining symbols of the plurality of symbols define a second plurality of symbols, and determine a second output amount for the play of the electronic game based upon the second plurality of symbols. The instructions further cause the processor to present the second output amount for the play of the electronic game, for each symbol position of the plurality of symbol positions other than the symbol position including the consolidated symbol, cause display of a third plurality of symbols for one of the number of future plays, the third plurality of symbols and the consolidated symbol defining a fourth plurality of symbols, determine a third output amount based upon the fourth plurality of symbols, and present the third output amount for the one of the number of future plays.

In another aspect, a non-transitory computer-readable storage medium with instructions stored thereon is described. The instructions, in response to execution by a processor, cause the processor to cause display of a plurality of symbols at a plurality of symbol positions on a display device wherein the plurality of symbols correspond to an output amount for a play of an electronic game, transmit the output amount for the play of the electronic game, and determine that the plurality of symbols includes a plurality of consolidating symbols. The instructions also cause the processor to cause display of the plurality of consolidating symbols consolidating into a consolidated symbol at a symbol position of the plurality of symbol positions previously occupied by a consolidating symbol wherein the consolidated symbol is associated with a number of future plays of the electronic game, cause any vacant symbol positions of the plurality of symbol positions to be filled with new symbols wherein the new symbols, the consolidated symbol, and any remaining symbols of the plurality of symbols define a second plurality of symbols, determine a second output amount for the play of the electronic game based upon the second plurality of symbols, and transmit the second output amount for the play of the electronic game. The instructions further cause the processor to, for each symbol position of the plurality of symbol positions other than the symbol position including the consolidated symbol, cause display of a third plurality of symbols for one of the number of future plays, the third plurality of symbols and the consolidated symbol defining a fourth plurality of symbols, determine a third output amount based upon the fourth plurality of symbols, and transmit the third output amount for the one of the number of future plays.

In yet another aspect, a method of electronic gaming implemented by a processor in communication with a memory is described. The method includes causing display of a plurality of symbols at a plurality of symbol positions on a display device wherein the plurality of symbols correspond to an output amount for a play of an electronic game, presenting the output amount for the play of the electronic game, and determining that the plurality of symbols includes a plurality of consolidating symbols. The method also includes causing display of the plurality of consolidating symbols consolidating into a consolidated symbol at a symbol position of the plurality of symbol positions previously occupied by a consolidating symbol, wherein the consolidated symbol is associated with a number of future plays of the electronic game, causing any vacant symbol positions of the plurality of symbol positions to be filled with new symbols wherein the new symbols, the consolidated symbol, and any remaining symbols of the plurality of symbols define a second plurality of symbols, determining a second output amount for the play of the electronic game based upon the second plurality of symbols, and presenting the second output amount for the play of the electronic game. The method further includes, for each symbol position of the plurality of symbol positions other than the symbol position including the consolidated symbol, causing display of a third plurality of symbols for one of the number of future plays, the third plurality of symbols and the consolidated symbol defining a fourth plurality of symbols, determining a third output amount based upon the fourth plurality of symbols, and presenting the third output amount for the one of the number of future plays.

DETAILED DESCRIPTION

Figure 1:
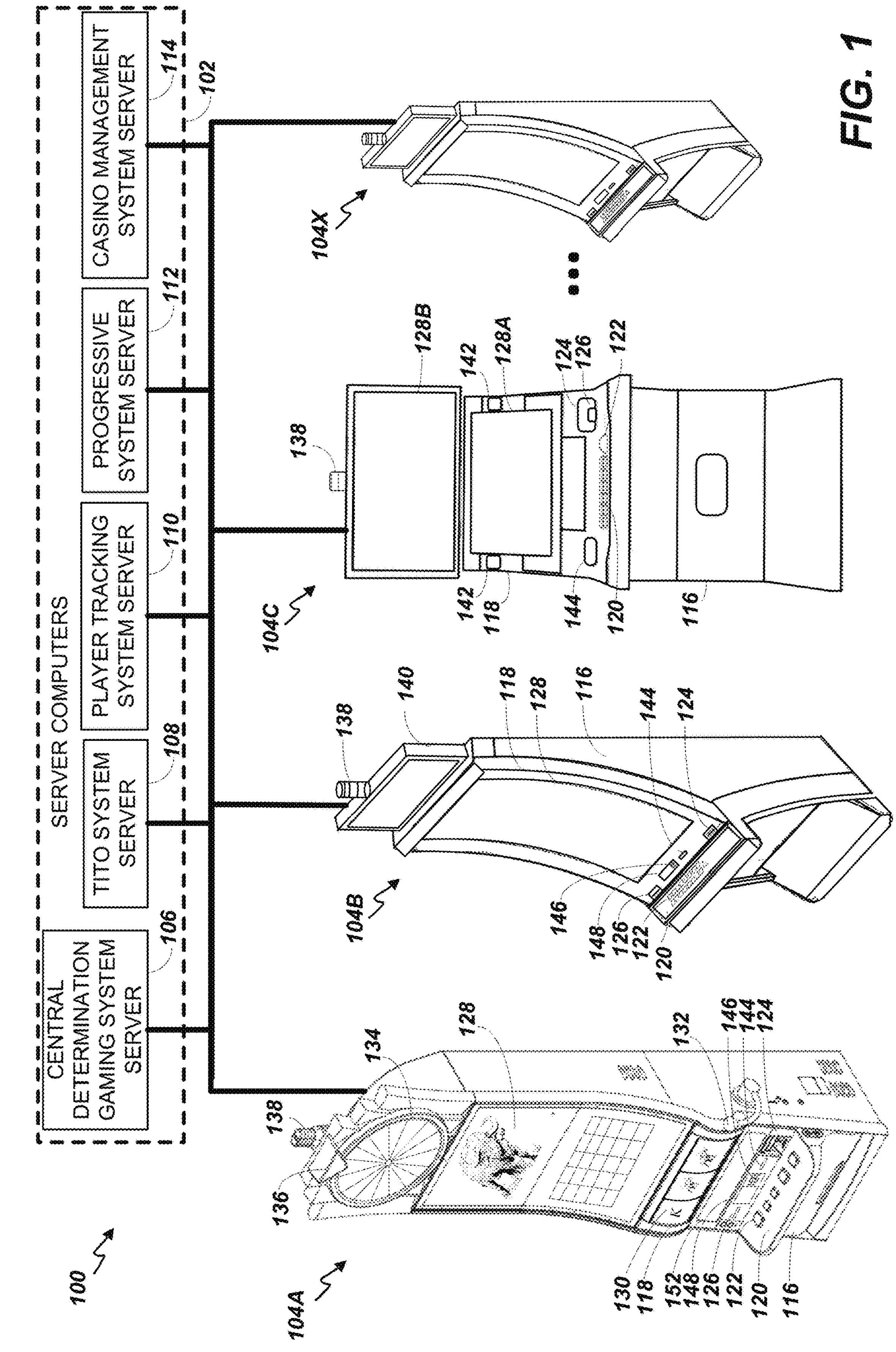
FIG. 1 is an exemplary diagram showing several EGMs networked with various gaming related servers.

Described herein are systems and methods for consolidating symbols in electronic gaming. For example, symbols may be consolidated in Class II or Class III games and/or primary/base games or bonus games. In the example embodiment, Wild symbols (e.g., symbols that may act as/be replaced by any other symbol in a game evaluation—for example, to achieve one or more high wins and/or allow winning combinations of symbols to be achieved more easily) are consolidated.

For example, Wild symbols may be displayed at any symbol position of a plurality of symbol positions. Winning paylines are paid based upon symbols displayed at the plurality of symbol positions. In the example embodiment, if two or more Wild symbols are displayed adjacent to each other, they consolidate into one Wild. Cascading symbols may fill in the symbol positions that the Wilds vacated, and any line wins are paid based upon the symbols displayed after the Wild symbols are consolidated. In some embodiments, any displayed Wild symbols may be consolidated (e.g., and do not need to be adjacent to each other to be consolidated). In some embodiments, a number of displayed Wilds that are consolidated may be randomly determined.

Once a Wild is consolidated, the consolidated symbol may become one or more of a variety of different bonus options. For example, the new consolidated Wild may be displayed with a number associated therewith (e.g., a "Sticky Wild"). The number may represent how many spins the consolidated Wild will remain on the screen while other symbol positions are spun (e.g., resulting in a higher chance of winning during those spins because of the persistence of the Wild across a plurality of spins). As another example, the number associated with the Wild may indicate a multiplier to be applied to any win line pays (e.g., winning pay lines that include the Wild and/or that do not include the Wild). In some embodiments, the number may indicate a combination of the above examples (e.g., a number of spins and a multiplier) or any other bonus.

Certain technical benefits are realized based upon the present disclosure. For example, in Class II embodiments, scripts may be generated and stored in one or more lookup tables. RNG outcomes may determine which script to utilize to convey/communicate a game outcome (e.g., an outcome amount is determined and a random determination is made as to which symbol configurations/display sequences to display to communicate the outcome). For example, scripts may be stored according to output amount, and each script may include multiple game outcomes associated with an outcome amount (e.g., one or more of a preliminary outcome, an outcome as symbols are consolidating, and an outcome including a consolidated symbol). Further, because the scripts are associated with display sequences for different game outcomes, computational resources are saved and computer components operate more efficiently because, in some embodiments, once a script is determined, the script controls which display sequences to use to communicate a total game outcome (e.g., and no further determinations need to be made).

Further, in Class III embodiments additional/alternative technical benefits are realized. For example, a plurality of random determinations may be made (e.g., via a plurality of RNG outcomes and/or a plurality of lookup tables) in order to determine not only one or more game outcomes but also one or more display features. For example, which symbol position other symbols consolidate into may be randomly determined, a number of symbols to consolidate may be randomly determined, an order in which symbols consolidate into a consolidated symbol may be randomly determined, which bonus is associated with the consolidated symbol may be randomly determined, and so forth. The amount of random determinations possible in embodiments described herein (e.g., Class II, Class III, etc.) result in an increased variety of possible game outcomes to be provided and therefore an improved game as it is less likely any outcomes would be repeated (e.g., and/or displayed in the same manner).

Certain display benefits are also realized herein as technical benefits achieved by the present disclosure (e.g., because certain technical problems arise when trying to communicate/display a significant amount of information on a screen of limited size). For example, as explained herein, consolidating symbols are controlled to consolidate into a consolidated symbol (e.g., simultaneously, one-by-one, etc.). In some embodiments, animations may be displayed during the consolidation process to better communicate to a player that consolidation is occurring (e.g., a firework animation with each consolidation). In some embodiments, a number is incrementally increased as symbols consolidate (e.g., a “1” is displayed after a first consolidation, a “2” is displayed after a second consolidation, and so forth). The displayed number may be overlaid upon a consolidated symbol and/or associated with a bonus provided with a consolidated symbol (e.g., a number of free spins, a multiplier, etc.). Accordingly, the present disclosure provides a variety of improvements in communicating information to a player in a limited amount of display space/real estate—thereby providing an improved interface.

In some embodiments, consolidating symbols are consolidated in a determined order to maximize the number of consolidating symbols that are consolidated. For example, in some embodiments only adjacent consolidating symbols are consolidated. Accordingly, in those embodiments, consolidating symbols may be consolidated one-by-one (e.g., from left to right, right to left, up to down, or down to up, as examples) such that consolidation of certain consolidating symbols does not leave vacant space adjacent another consolidating symbol, such that the consolidating symbol adjacent a vacant space may now not be consolidated because it is now adjacent a vacant space instead of a another consolidating symbol (e.g., see FIGS. 4 and 5 as an example).

To present further game outcomes once the consolidating symbols are consolidated, new symbols are added to now-vacant display positions (e.g., left vacant by the consolidating symbols). Accordingly, symbols may be displayed as “cascading” downward to fill in the vacant symbol positions left vacant from consolidating symbols, and also symbol positions left vacant by symbols that cascade downward to fill in previously-vacant symbol positions.

In the example embodiment, symbols are controlled as being consolidated and new symbols are added to vacant symbol positions all while controlling return to player (RTP). Certain technical problems are realized when generating new display improvements for electronic games because RTP must also be controlled. Accordingly, in example embodiments described herein, RTP is controlled by at least one lookup table (e.g., wherein at least one lookup in the at least one lookup table is controlled by a bingo outcome or an RNG call, as examples) indicating at least one of whether to consolidate consolidating symbols one by one or simultaneously, which bonus to apply to a consolidated symbol, which outcomes to provide while the consolidated symbol is present/displayed, and/or which symbols to add to the plurality of symbol positions to replace vacant symbol positions left behind by consolidating symbols and/or cascading symbols.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
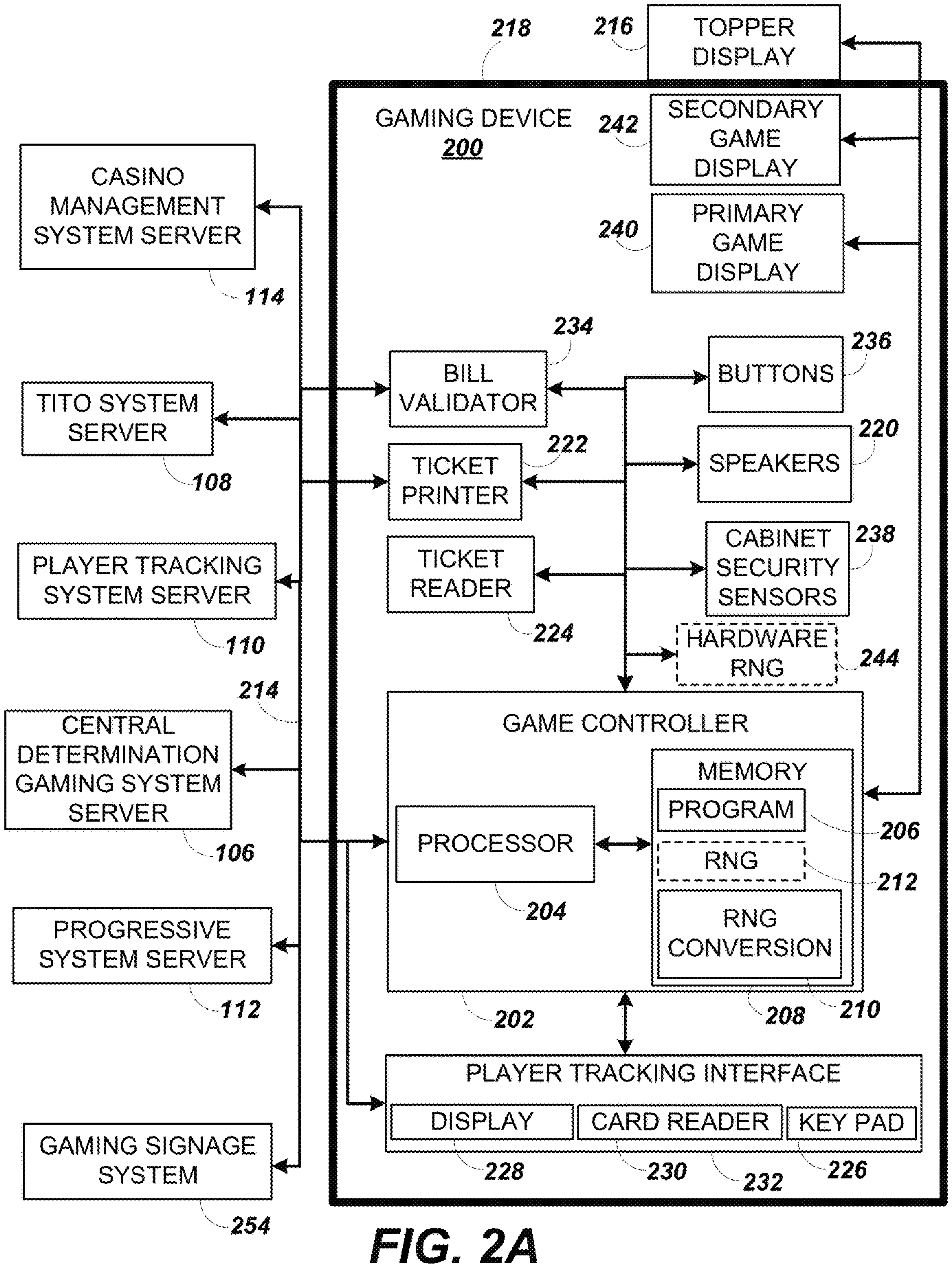
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data values upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
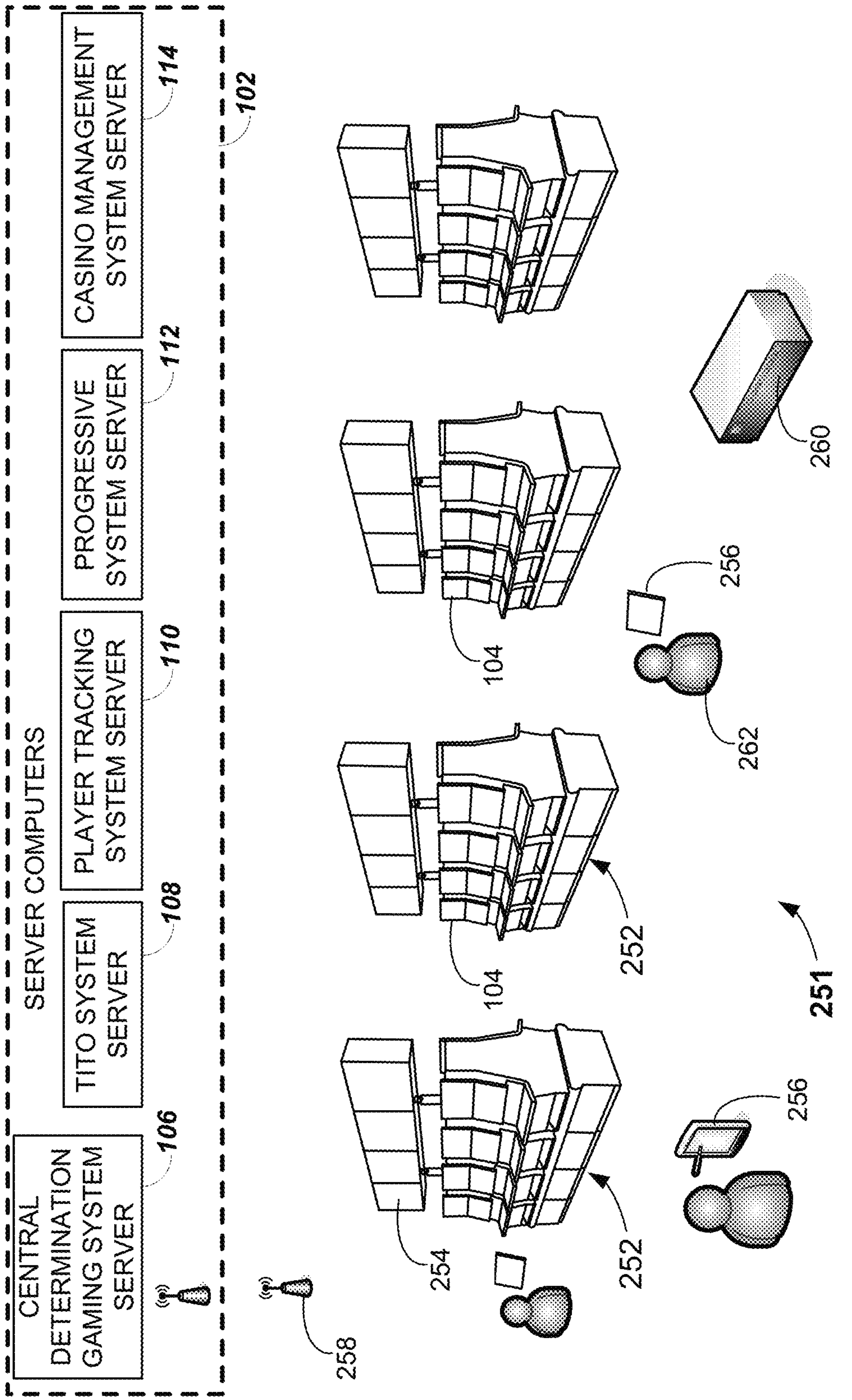
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
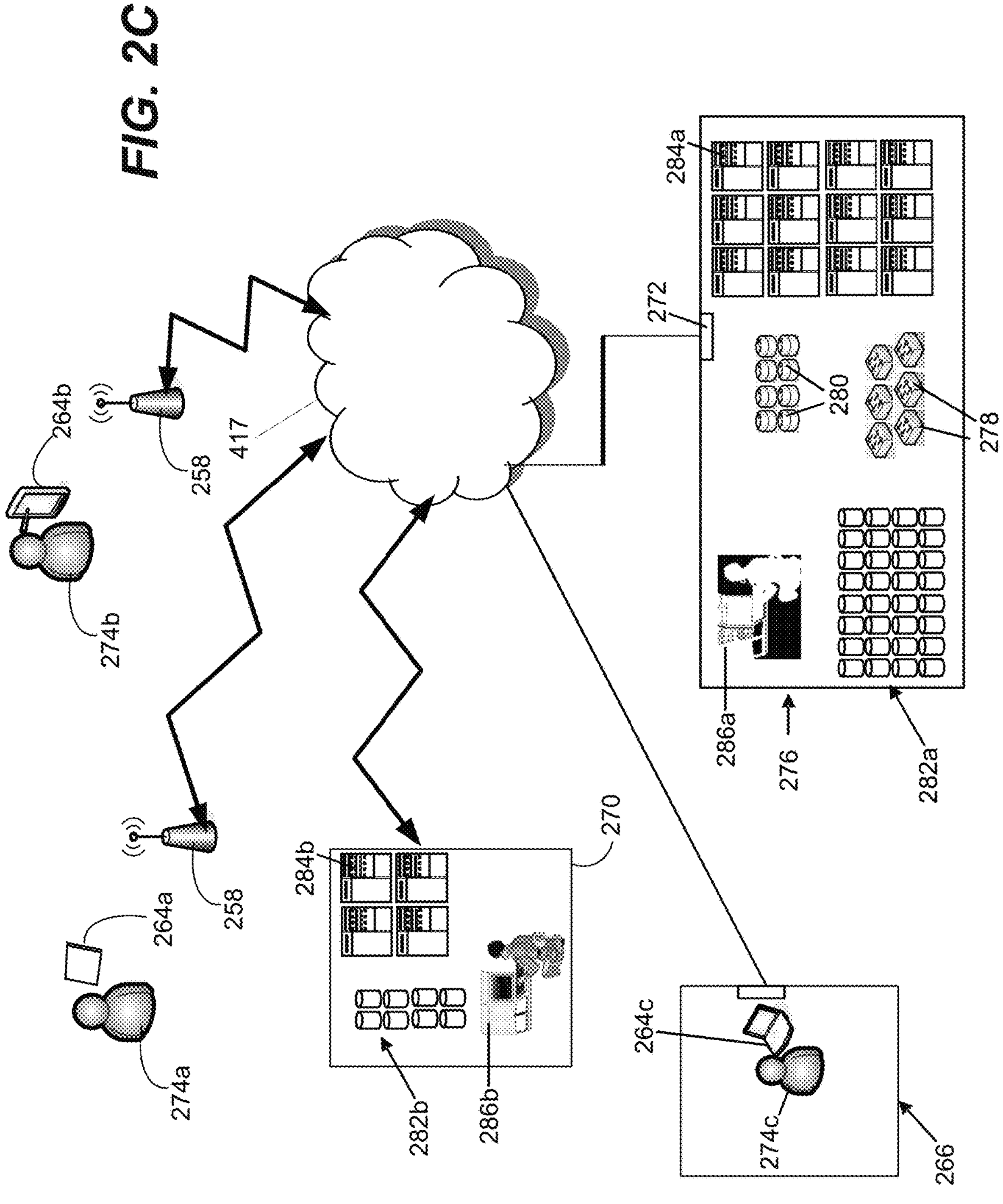
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
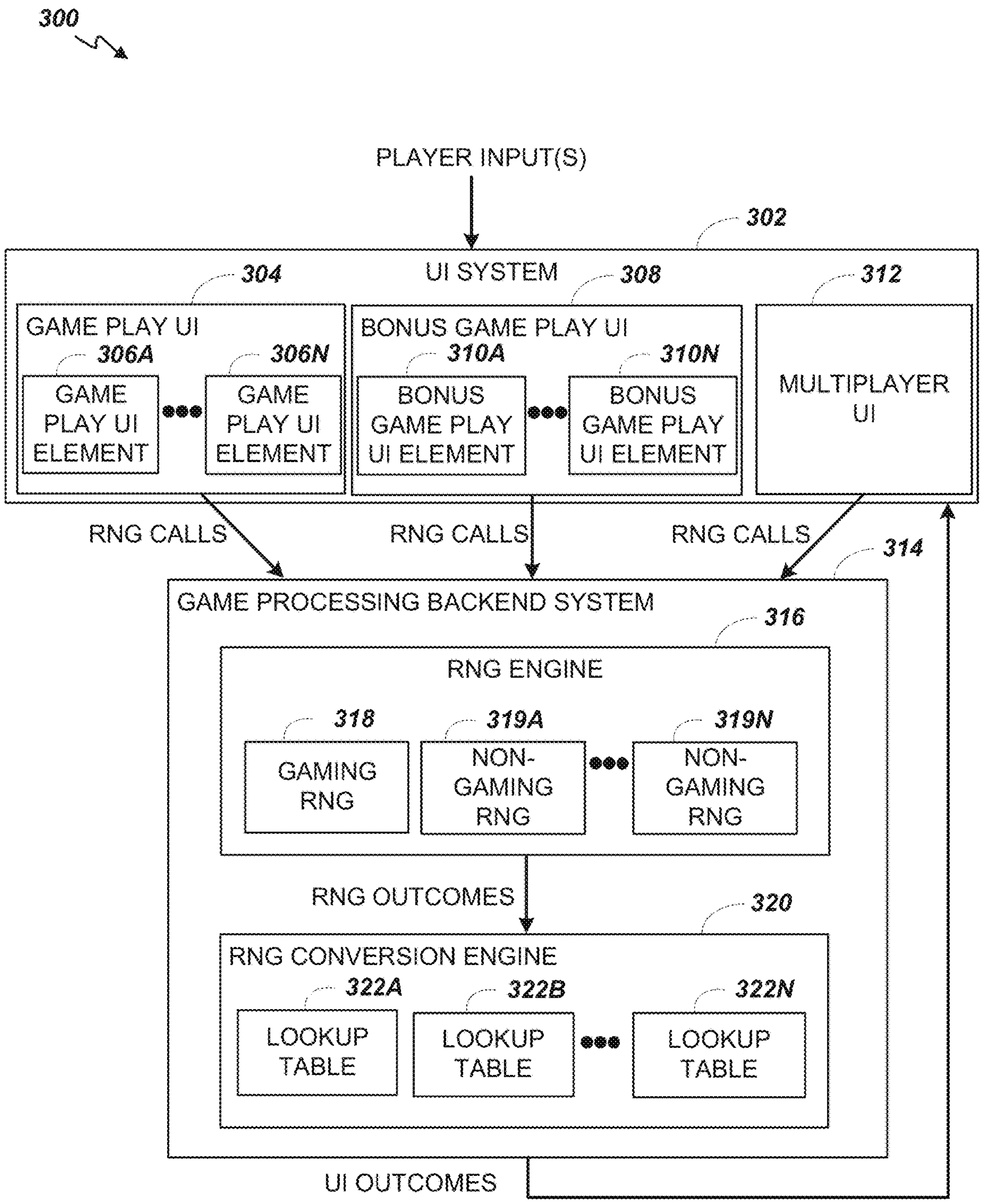
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
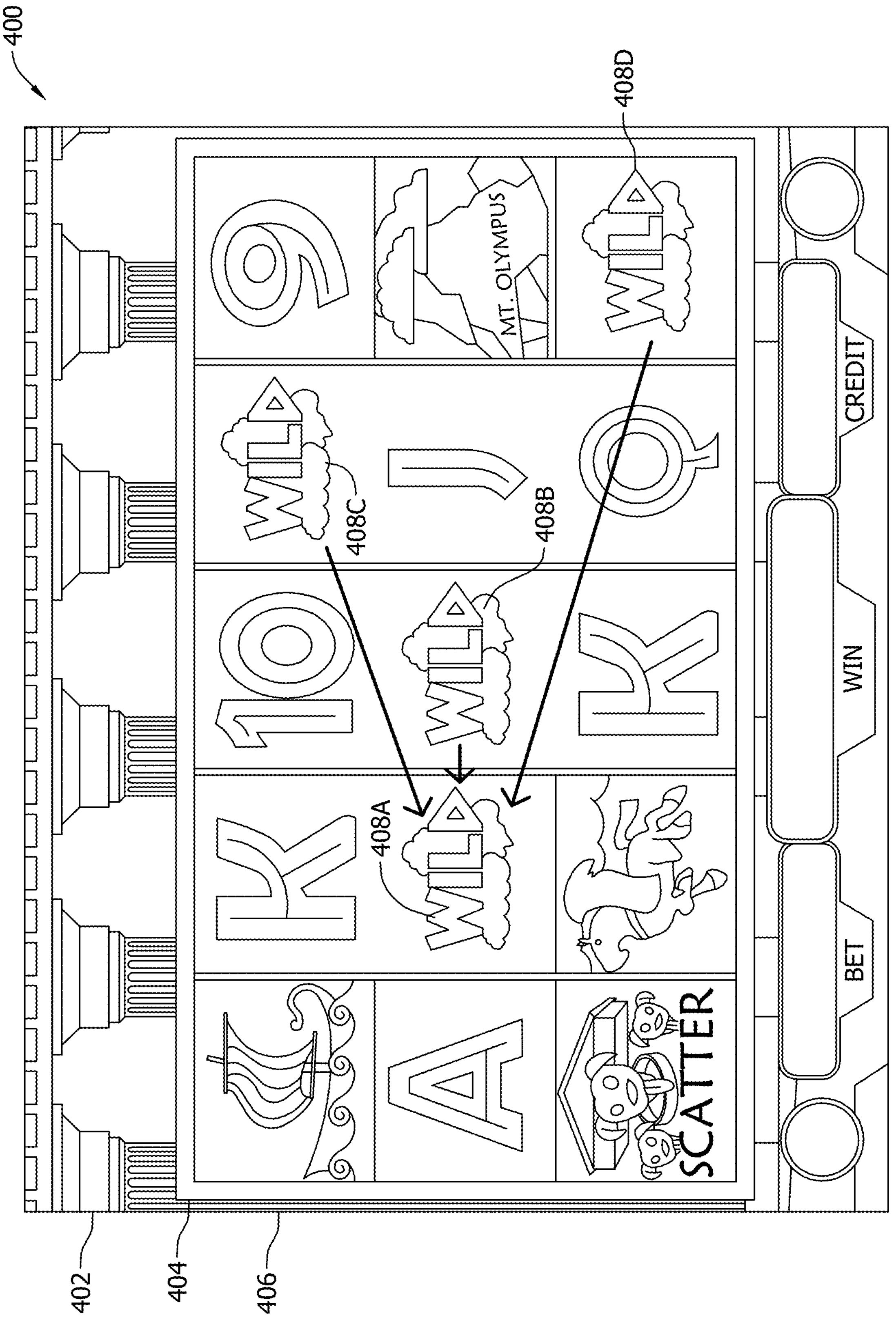
FIG. 4 illustrates an example screenshot and/or interface of an electronic game before symbols are consolidated, in accordance with the present disclosure and for use with the architectures, systems, and/or environments shown in FIGS. 1-3.

FIG. 4 illustrates an example screenshot 400 and/or interface of an electronic game before symbols are consolidated, in accordance with the present disclosure. As shown in FIG. 4, a plurality of symbols 404 are displayed in a display area 402 of limited size (e.g., of a display device) at a plurality of symbol positions 406. Plurality of symbols 404 includes four Wild symbols 408A-D. In some embodiments, plurality of symbols 404 may be determined by a bingo outcome (e.g., Class II embodiments). In some embodiments, plurality of symbols 404 may be determined by an RNG call (e.g., to RNG 318) and one or more lookup tables (e.g., 322A-N).

Figure 5:
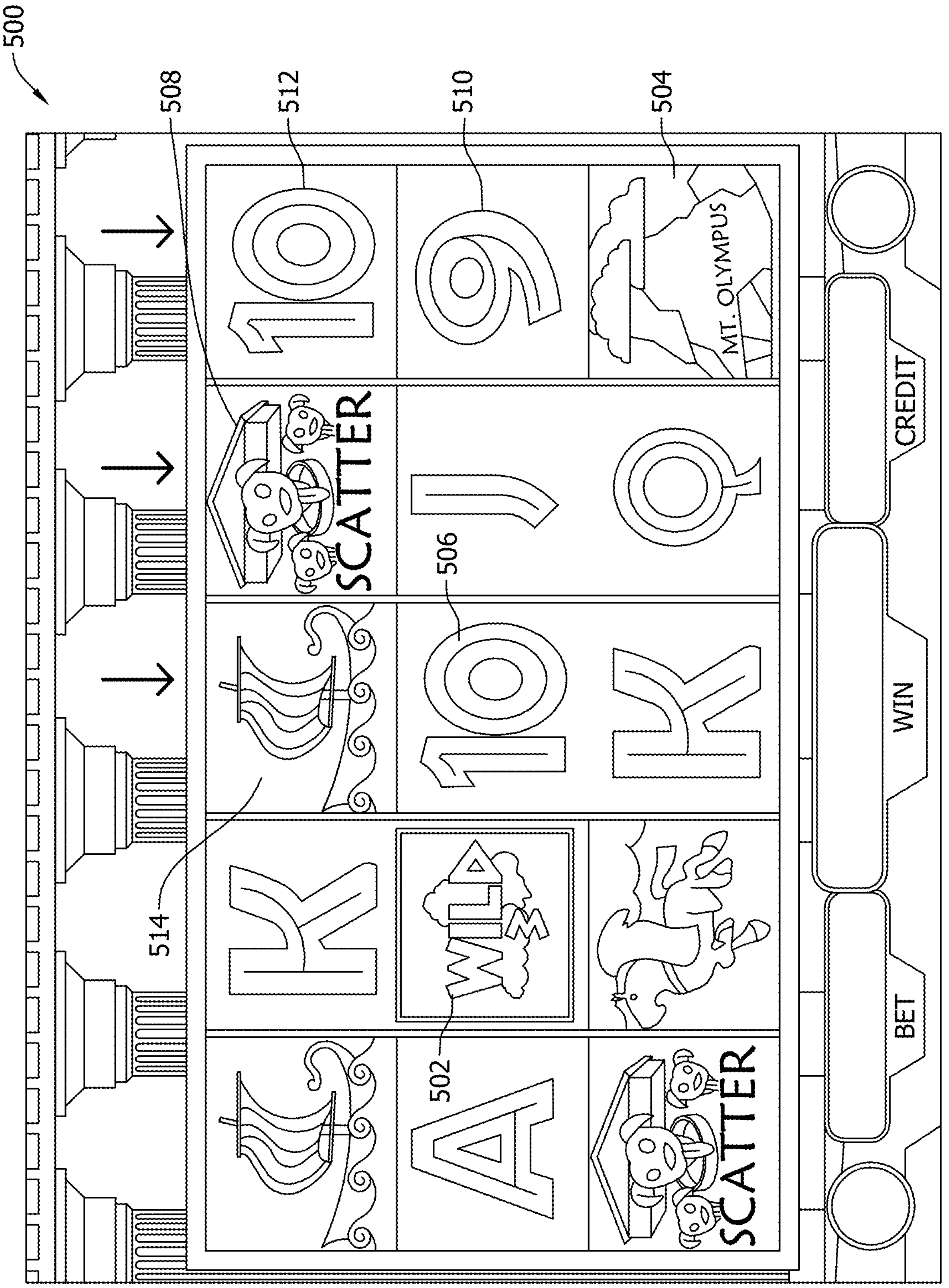
FIG. 5 illustrates an example screenshot and/or interface of the electronic game shown in FIG. 4 after symbols are consolidated.

As shown by arrows 410 in FIG. 4, Wild symbols 408A-D will be consolidated into a consolidated Wild symbol (shown in FIG. 5). In the example embodiment, before Wild symbols 408A-D are consolidated, any winning paylines associated with plurality of symbols 404 are paid/outputted.

It should be appreciated that while Wild symbols 408A-D are described with respect to an example embodiment herein, it is envisioned that any type of symbol(s) may be consolidated. Further, symbols may be consolidated in a variety of ways in accordance with the present disclosure. For example, in some embodiments Wilds may be consolidated simultaneously. In some embodiments, Wilds may be consolidated one-by-one (e.g., or by twos, threes, etc.). In embodiments where Wilds are consolidated one at a time, payouts may be made each time a Wild is consolidated. In other words, a first payout would be made based upon an initial plurality of symbols shown, a second payout would be made after a first Wild was consolidated, a third payout would be made after a second Wild was consolidated, and so forth (e.g., with symbols replacing vacant spaces before each payout). In some embodiments, the order in which Wilds are consolidated may be determined/configured such that the payouts after each respective consolidation increase with respect to previous payouts (e.g., to provide a better gameplay experience).

Further, symbol positions vacated by symbols that are consolidated may be filled with new symbols in a variety of ways. For example, vacated symbol positions may each be their own reel that is spun again after a symbol previously displayed therein is consolidated (e.g., such that a new symbol is displayed therein once the reel is stopped). In some embodiments, symbols may "cascade" downward to replace vacated symbol positions (e.g., see FIG. 5 as an example). In some embodiments, vacant spaces may all be filled by the same symbol (e.g., a scatter symbol) and/or different symbols (e.g., randomly determined).

In some embodiments, the symbol to which other symbols are consolidated may be randomly determined. In some embodiments, the symbol to which other symbols are consolidated may be predetermined (e.g., according to a lookup table).

Symbols may be consolidated in Class II or Class III games and/or primary/base games or bonus games. In the example embodiment, Wild symbols (e.g., symbols that may act as/be replaced by any other symbol in a game evaluation—for example, to achieve one or more high wins and/or allow winning combinations of symbols to be achieved more easily) are consolidated.

For example, winning paylines are paid based upon symbols displayed at plurality of symbol positions 406. In the example embodiment, symbols 408A-D consolidate into one Wild. Cascading symbols may fill in the symbol positions that Wilds 408A-D vacated, and any line wins are paid based upon the symbols displayed after the Wild symbols are consolidated.

Once a Wild is consolidated, it may become one or more of a variety of different options (e.g., see FIG. 5). For example, the new consolidated Wild may be displayed with a number associated therewith (e.g., a "Sticky Wild"). The number may represent how many spins the consolidated Wild will remain on the screen (e.g., resulting in a higher chance of winning during those spins because of the persistence of the Wild across a plurality of spins). As another example, the number associated with the Wild may indicate a multiplier to be applied to any win line pays (e.g., win lines that include the Wild and/or that do not include the Wild). In some embodiments, the number may indicate a combination of the above examples (e.g., a number of spins and a multiplier) or any other bonus.

FIG. 5 illustrates an example screenshot 500 and/or interface of the electronic game shown in FIG. 4 after symbols are consolidated. As shown in FIG. 5, symbols 408A-D in display area 402 have been consolidated into a consolidated symbol 502. Further, vacant symbol positions left by symbols 408A-D have been filled by "cascading" (e.g., slid downward) symbols from above. For example, Mt. Olympus symbol 504 has slid downward to replace symbol 408D and 10 symbol 506 has slid down to replace symbol 408B. Symbol 408C was positioned in an upper row of symbol positions 406 and thus no symbol was available to cascade downward. Accordingly, a new Scatter symbol 508 has replaced symbol 408C. As symbols 504 and 506 cascaded downward, new vacant symbol positions were created. Accordingly, 9 symbol 510 slid down one position and a new 10 symbol 512 replaced the position previously occupied by 9 symbol 510. A new ship symbol 514 has replaced symbol 408B.

Further, consolidated symbol 502 includes an indicator (e.g., 804 shown in FIG. 8) currently displaying the number 3. In the example shown in FIG. 5, the indicator indicates a number of spins (e.g., free spins) for which consolidated symbol 502 will remain in display area 402. Accordingly, 3 spins including consolidated symbol 502 will occur (e.g., all other symbol positions/reels will be spun other than the symbol position including symbol 502 for 3 spins). In the example embodiment, the indicator is based upon the number of symbols consolidated into consolidated symbol 502. For example, as shown in FIG. 5, 3 symbols (408B-D) were consolidated (e.g., into symbol 408A), and thus 3 spins are presented. With each spin of the electronic game including the indicator, the indicator may be decremented until 0 spins remain and symbol 502 is no longer present.

In some embodiments, the indicator may indicate a bonus other than a number of spins and may be based on factors other than an amount of symbols consolidated into consolidated symbol 502. For example, the indicator may indicate an award multiplier to be applied to a number of paylines (e.g., paylines including and/or excluding consolidated symbol 502).

In some embodiments, only consolidating symbols 408A-D that are adjacent another consolidating symbol 408A-D in the plurality of symbols are consolidated. In some embodiments, any displayed consolidating symbols 408A-D are consolidated.

In embodiments where adjacent consolidating symbols are consolidated, consolidating symbols may be consolidated one-by-one (e.g., from left to right, right to left, up to down, or down to up, as examples) such that consolidation of certain consolidating symbols does not leave vacant space adjacent another consolidating symbol, such that the consolidating symbol adjacent a vacant space may now not be consolidated because it is now adjacent a vacant space instead of a another consolidating symbol. In the example of FIGS. 4 and 5, for example, symbol 408B would not be first controlled as consolidating to the symbol position of symbol 408A because that would leave the symbol position previously occupied by symbol 408B vacant (e.g., not including a consolidating symbol). Thus, symbol 408C would not be adjacent a consolidating symbol and would not be consolidated. Accordingly, to maximize the number of adjacent symbols consolidated, symbol 408C would first be controlled as consolidating to the position of symbol 408B, and then a consolidation would occur to the position of symbol 408A, resulting in display of consolidated symbol 502 (e.g., in other embodiments symbols 408A-C may be consolidated left to right, resulting in consolidated symbol 502 being displayed at the symbol position previously occupied by symbol 408C).

As explained herein, game outcomes may be provided at various moments before, during, and after consolidation of consolidating symbols. For example, a first outcome may be provided when a first plurality of symbols are displayed (e.g., as shown in FIG. 4). Other outcomes may be provided as consolidating symbols consolidate. For example, outcomes may be provided as symbols consolidated one-by-one (e.g., in the example shown in FIGS. 4 and 5, three outcomes may be provided during consolidation, one after each of symbols 408B-D consolidate to the position of 408A and vacant positions left by symbols 408B-D are replaced) and/or symbols may consolidate all at once (e.g., in the example shown in FIGS. 4 and 5, one outcome may be provided during consolidation after symbols 408B-D consolidate to the position of 408A simultaneously and vacant positions left by symbols 408B-D are replaced). Further outcomes may be provided while a consolidated symbol is present. For example, a consolidated symbol may be present for three spins, as shown in FIG. 5.

Game outcomes as described herein may be selected and/or determined to control RTP all while providing the various other benefits (e.g., display benefits) described herein. For example, in some embodiments, a total game outcome may be determined for the electronic game. The total game outcome may be utilized to determine any outcomes provided based upon the initial plurality of symbols (e.g., shown in FIG. 4), outcomes provided during consolidation, and/or outcomes provided while the consolidated symbol is present. For example, a total outcome of 1000 credits may initially be determined. Accordingly, the total outcome of any outcomes provided based upon the initial plurality of symbols, outcomes provided during consolidation, and/or outcomes provided while the consolidated symbol is present would need to total 1000 credits (e.g., and the systems and methods described herein control at least the outcomes described above such that the total of the outcomes would equal 1000 credits).

Splitting of a total game outcome (e.g., based upon a bingo outcome, lookup table, and or RNG call) amongst different outcomes is important for controlling RTP while managing computer resources. For example, generating a total outcome before generating other outcomes (e.g., to total the total outcome) limits the number of outcomes that could be presented based upon the initial plurality of symbols, during consolidation, and/or while the consolidated symbol is present. In some embodiments, the outcomes whose summation equals the total outcome may be presented in order of equal and/or increasing output amount. In other words, the initial plurality of symbols may be associated with a lower output amount, outcomes presented during consolidation may be presented in order of equal and/or increasing output, and outcomes presented while the consolidated symbol is present may also be presented in order of equal and/or increasing output (e.g., wherein the initial output is a lowest output, the outputs during consolidation are equal to or greater than the initial output, and the outputs while the consolidated symbol is present are equal to or greater than the outputs during consolidation).

Figure 6:
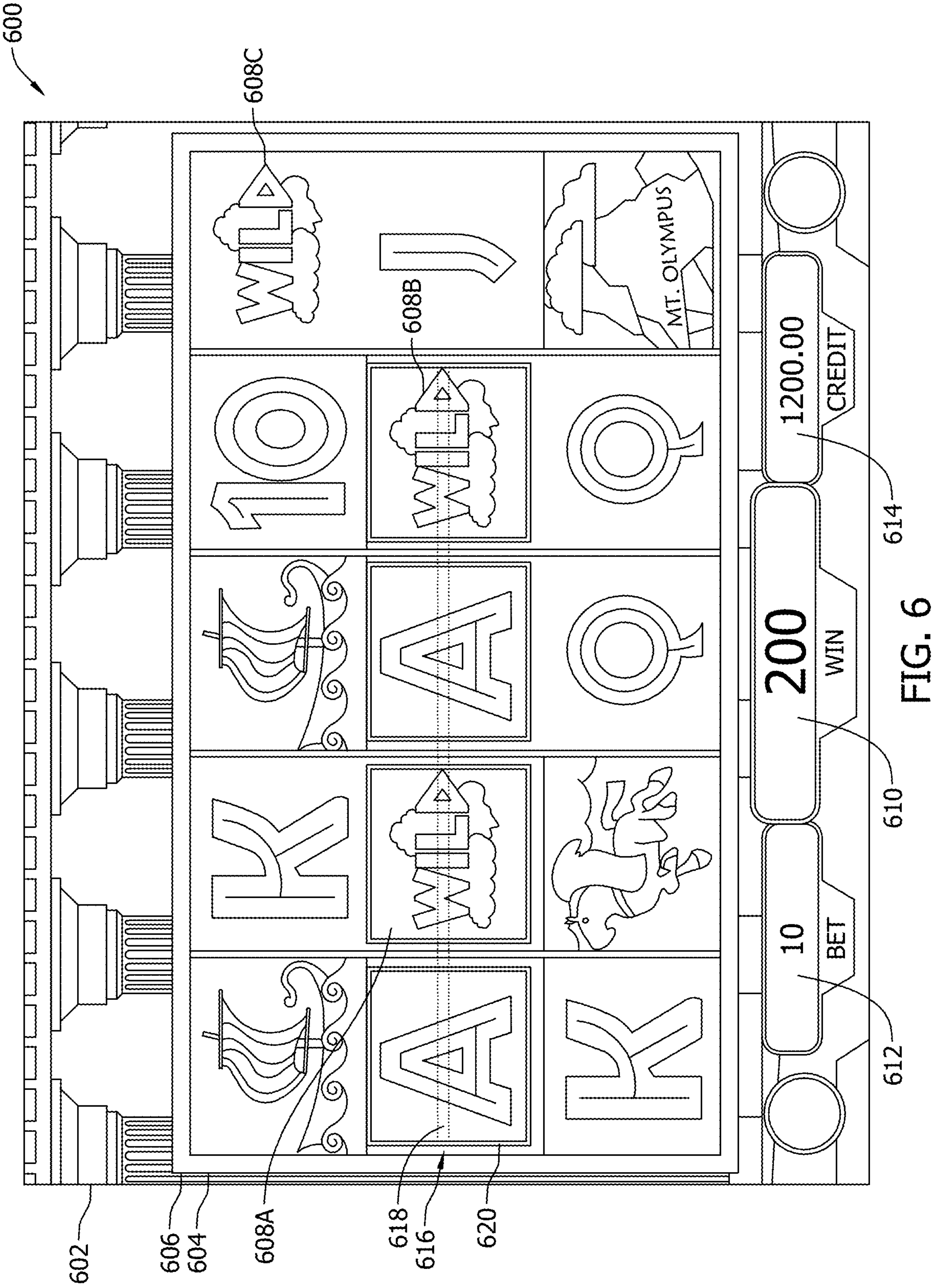
FIG. 6 illustrates a first example screenshot and/or interface of a sequence of the electronic game shown in FIG. 4.

FIG. 6 illustrates a first example screenshot 600 and/or interface of a sequence of the electronic game shown in FIG. 4. As shown in FIG. 6, a plurality of symbols 604 are displayed in a display area 602 at a plurality of symbols positions 606. Plurality of symbols 604 includes three Wild symbols 608A-C.

As explained herein, symbols 604 communicate a game outcome. Accordingly, a win associated with symbols 604 is displayed at win display area 610. A bet amount is shown at bet amount display area 612 and a total credit amount (e.g., for the gaming session and associated with a player account) is displayed at credit display area 614. In the example shown in FIG. 6, symbols 604 are associated with a two hundred credit win. Thus, two hundred credits are displayed at win display area 610. For example, the two hundred credit win may be associated with a subset 616 of symbols 604 across a payline 618. To illustrate the subset 616, each symbol position of the subset may include a highlighted border 620 (e.g., or other animation).

Figure 7:
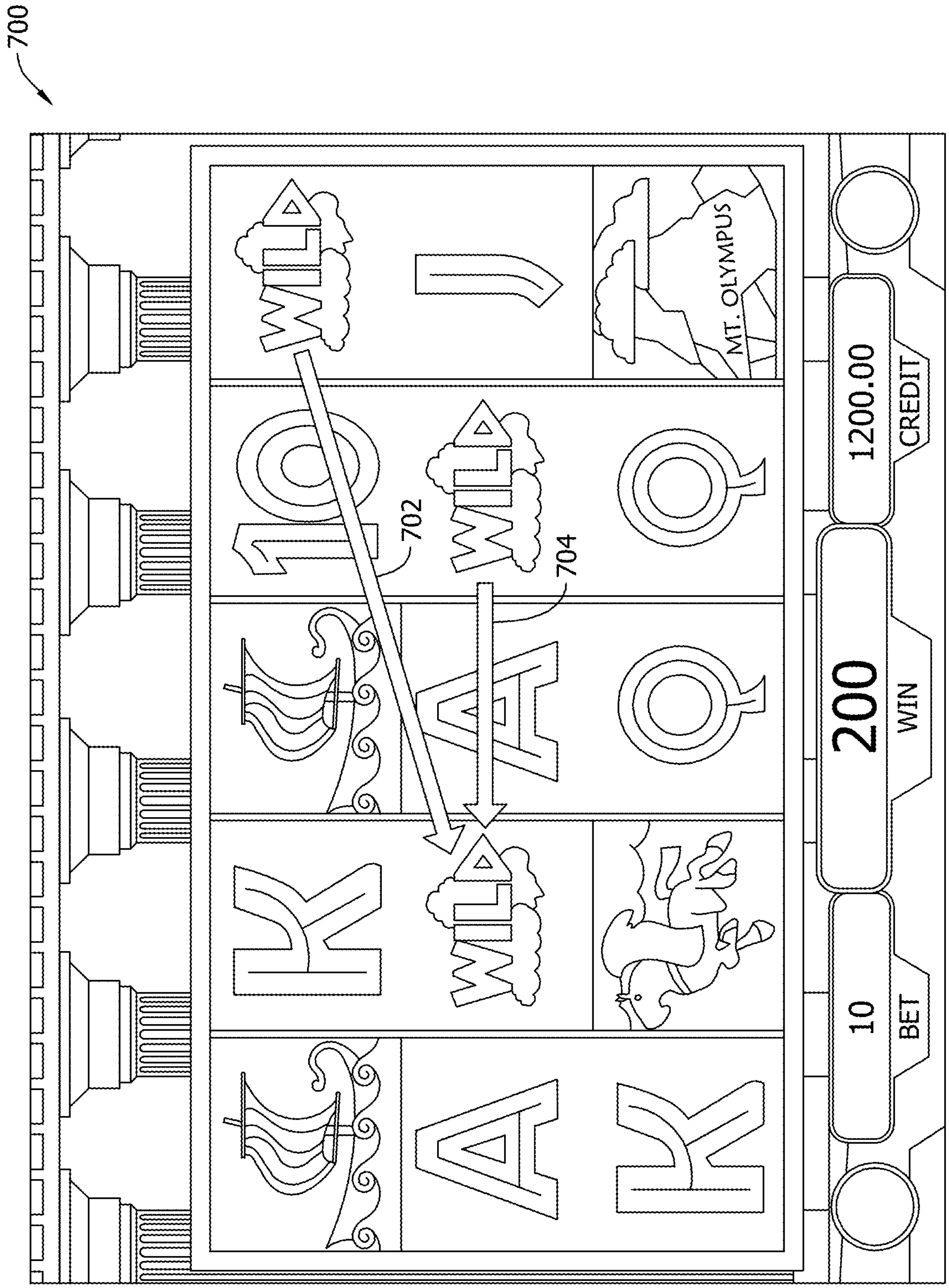
FIG. 7 illustrates a second example screenshot and/or interface of the sequence that begins with FIG. 6.

FIG. 7 illustrates a second example screenshot 700 and/or interface of the sequence that begins with FIG. 6. Wild symbols 608A-C are determined to be consolidated, as described herein (e.g., and as illustrated by arrows 702, 704). Notably, symbols 608A-C are consolidated after the game outcome (e.g., two hundred credits) associated with evaluation of symbols 604 is presented.

Figure 8:
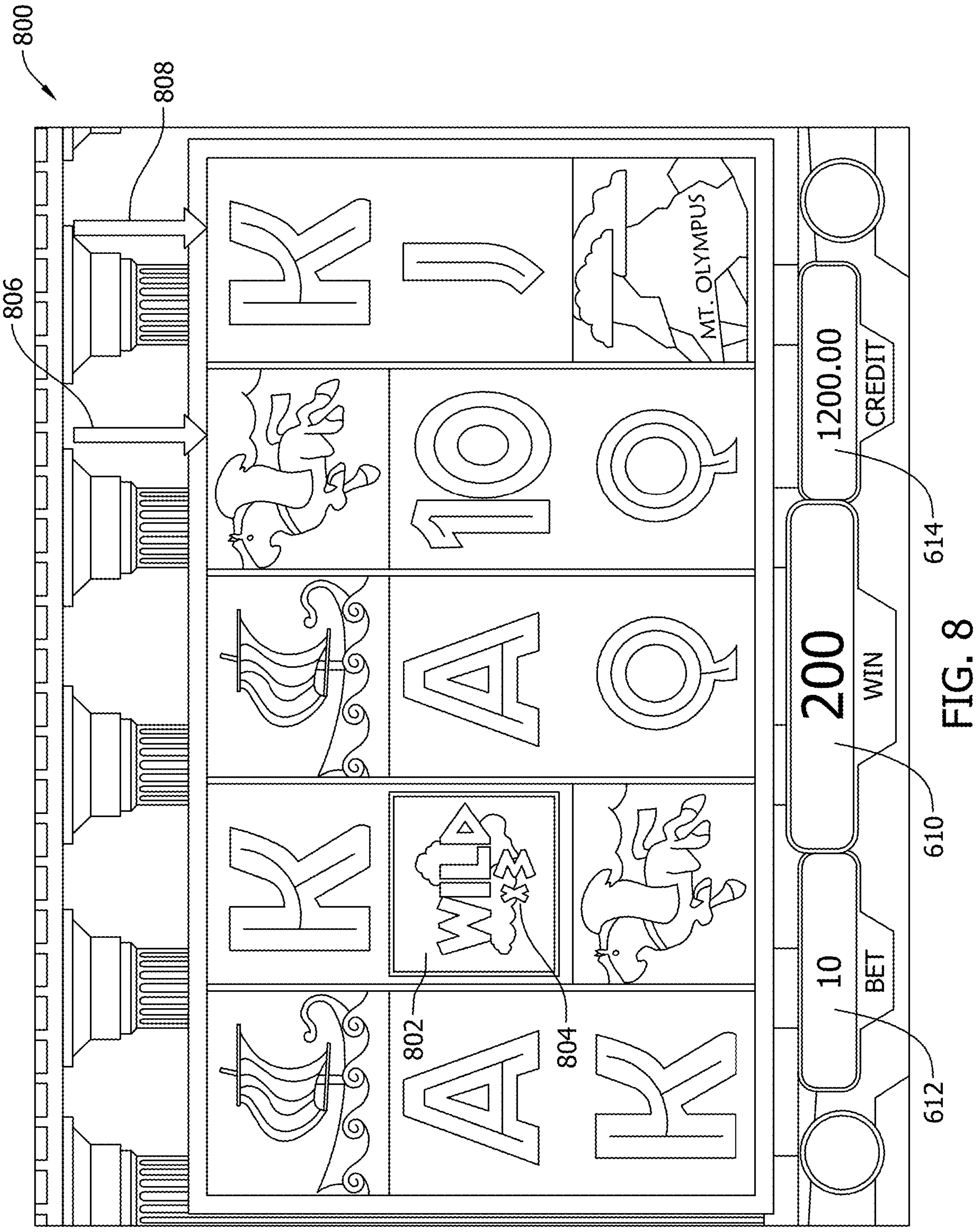
FIG. 8 illustrates a third example screenshot and/or interface of the sequence that begins with FIG. 6.

FIG. 8 illustrates a third example screenshot 800 and/or interface of the sequence that begins with FIG. 6. As shown in FIG. 8, Wild symbols 608A-C have been consolidated into consolidated Wild symbol 802. Notably, win display area 610, bet amount display area 612, and credit display area 614 display the same amounts as shown in FIG. 6 because no additional spins have occurred.

For example, three Wild symbols 608A-C were consolidated. Accordingly, an x3 icon 804 is displayed on (e.g., overlaid on) symbol 802. In some embodiments, x3 icon 804 may correspond to an award multiplier. For example, a win amount involving consolidated Wild symbol 802 with x3 icon 804 may be multiplied by three (or any other value, as indicated by the numeral following, or in some instances preceding, the "x" of icon 804, corresponding to the number of Wilds consolidated).

In some examples, consolidated Wild symbol 802 may be a persistent (e.g., "sticky") Wild symbol with x3 icon 804 corresponding to a number of subsequent reel spins in which the sticky Wild symbol will remain in the current symbol position (e.g., row 2, column 2). For example, as shown in FIG. 8, x3 icon 804 corresponds to three consolidated Wilds (e.g., 608A-C). In other examples, x3 icon 804 may be a value other than three, as indicated by the numeral following, or in some instances preceding, the "x" of icon 804 being different from three and corresponding to the number of Wilds consolidated.

Further, in some instances, icon 804 may decrement with each successive reel spin, finally 'spinning away' when the numeral of icon 804 decrements to 0. In this example, the numeral following (or preceding) the "x" of icon 804 may correspond to both an award multiplier and a number of persistent spins indicator, with the value decrementing with each successive spin.

In FIG. 8, Wild symbols 608B, 608C have vacated their respective symbol positions, and cascading symbols have replaced Wild symbols 608B, 608C. For instance, the "10" symbol has "cascaded" down one symbol position to fill the symbol position left vacant by Wild symbol 608B consolidating, and a new symbol (e.g., a unicorn as shown) has replaced the symbol position that the "10" symbol vacated. Further, a new symbol (e.g., a "K" or King symbol as shown) has replaced the symbol position left vacant by Wild symbol 608C consolidating. Down arrows 806, 808 illustrate the cascading described above.

Figure 9:
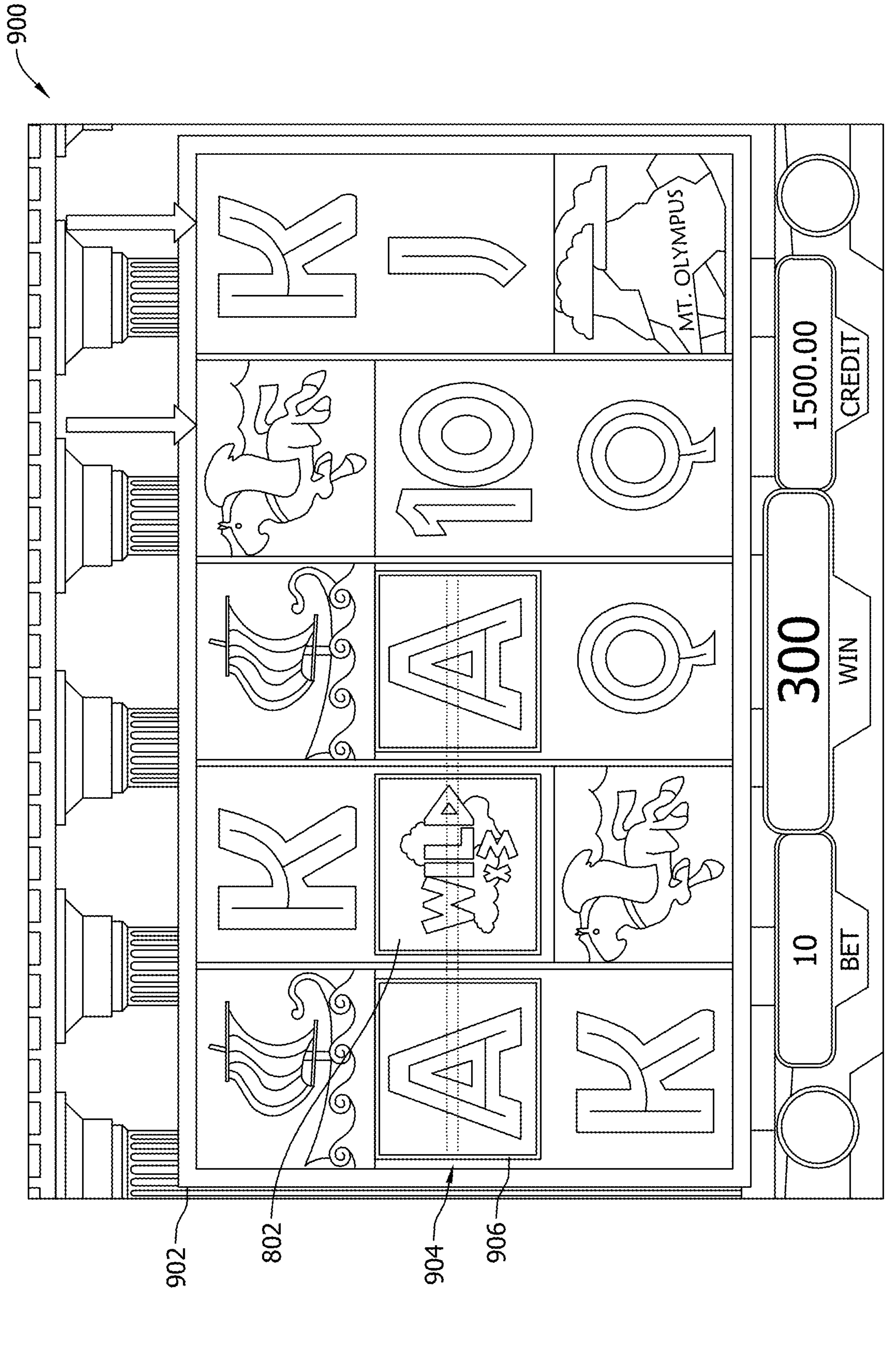
FIG. 9 illustrates a fourth example screenshot and/or interface of the sequence that begins with FIG. 6.

FIG. 9 illustrates a fourth example screenshot 900 and/or interface of the sequence that begins with FIG. 6. As shown in FIG. 9, a next game outcome is presented after the consolidation of Wild symbols 608A-C into consolidated symbol 802. For example, plurality of symbols 902 are associated with a win of three hundred credits. FIG. 9 shows that the three hundred credit win, shown in win display area 610, is associated with a subset 904 of the plurality of symbols 902, including consolidated symbol 802. In this example, the three hundred credit win corresponds to a three-symbol combination (two Aces and a Wild) corresponding to a one hundred credit win multiplied by a times three multiplier (indicated by the "3" of x3 icon 804). To illustrate the subset 616, each symbol position of the subset may include a highlighted border 906 (e.g., or other animation). Credit display area 614 is also increased by three hundred credits (e.g., according to the next game outcome).

Figure 10:
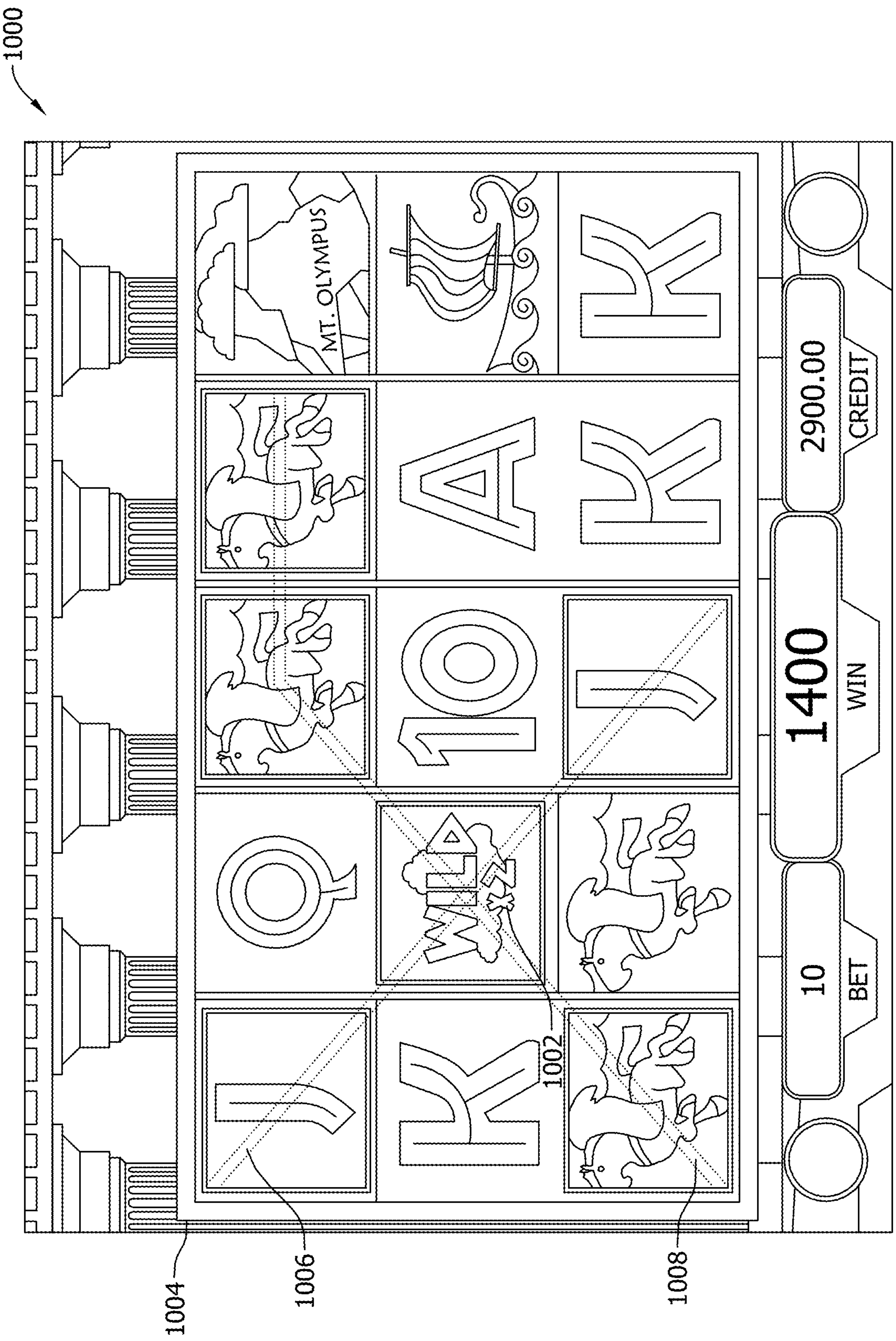
FIG. 10 illustrates a fifth example screenshot and/or interface of the sequence that begins with FIG. 6.

FIG. 10 illustrates a fifth example screenshot 1000 and/or interface of the sequence that begins with FIG. 6. As shown in FIG. 10, a next game outcome is presented while consolidated symbol 802 is held in place (e.g., for a first of three spins where consolidated symbol 802 will be held, based on x3 icon 804). As a next game outcome has been presented while consolidated symbol 802 is held, x3 icon 804 is decremented by one to an x2 icon 1002 on consolidated symbol 802 to communicate that consolidated symbol 802 will be held for two additional spins.

A new plurality of symbols 1004 illustrated in FIG. 10, and subset thereof, are associated with a fourteen hundred credit win, as shown in win display area 610 (e.g., and as incremented in credit display area 614). For example, fourteen hundred credits are associated with two payline wins 1006 (corresponding to a three-symbol combination, one hundred credit win), and 1008 (corresponding to a four-symbol combination, six hundred credit win) multiplied by a times two multiplier (indicated by the "2" of x2 icon 1002) as shown. To illustrate the subset, each symbol position of the subset may include a highlighted border 1010 (e.g., or other animation).

FIGS. 6-10 illustrate, in some embodiments, the splitting of a total game outcome (e.g., based upon a bingo outcome, lookup table, and or RNG call) amongst different outcomes (e.g., in a Class II embodiment). For example, a total outcome may be generated (e.g., including the two hundred credit, three hundred credit, and fourteen hundred credit wins) before generating other outcomes (e.g., to total the total outcome). As shown in FIGS. 6-10, the outcomes whose summation equals the total outcome are presented in order of increasing output amount. Accordingly, the two hundred credit outcome is presented first, followed by the three hundred credit outcome, and then the fourteen hundred credit outcome.

In other words, in Class II embodiments, scripts may be generated and stored in one or more lookup tables. RNG outcomes may determine which script to utilize to convey/communicate a total game outcome (e.g., an outcome amount is determined and a random determination is made as to which symbol configurations/display sequences to display to communicate the outcome). FIGS. 6-10 illustrate a portion of one such sequence (e.g., that may include sorting (e.g., increasing and/or decreasing) and/or filtering (e.g., removing losing game outcomes) game outcomes based on output amount). Because the scripts are associated with display sequences for different game outcomes, computational resources are saved and computer components operate more efficiently because, in some embodiments, once a script is determined, the script controls which display sequences to use to communicate a total game outcome (e.g., and no further determinations need to be made). For instance, in some embodiments of FIGS. 6-10, the outcomes presented in FIGS. 7-10 are determined when the outcome shown in FIG. 6 is determined (e.g., to allow for determining which outcomes to utilize to present a total game outcome, and/or sorting and/or filtering those outcomes).

Figure 11:
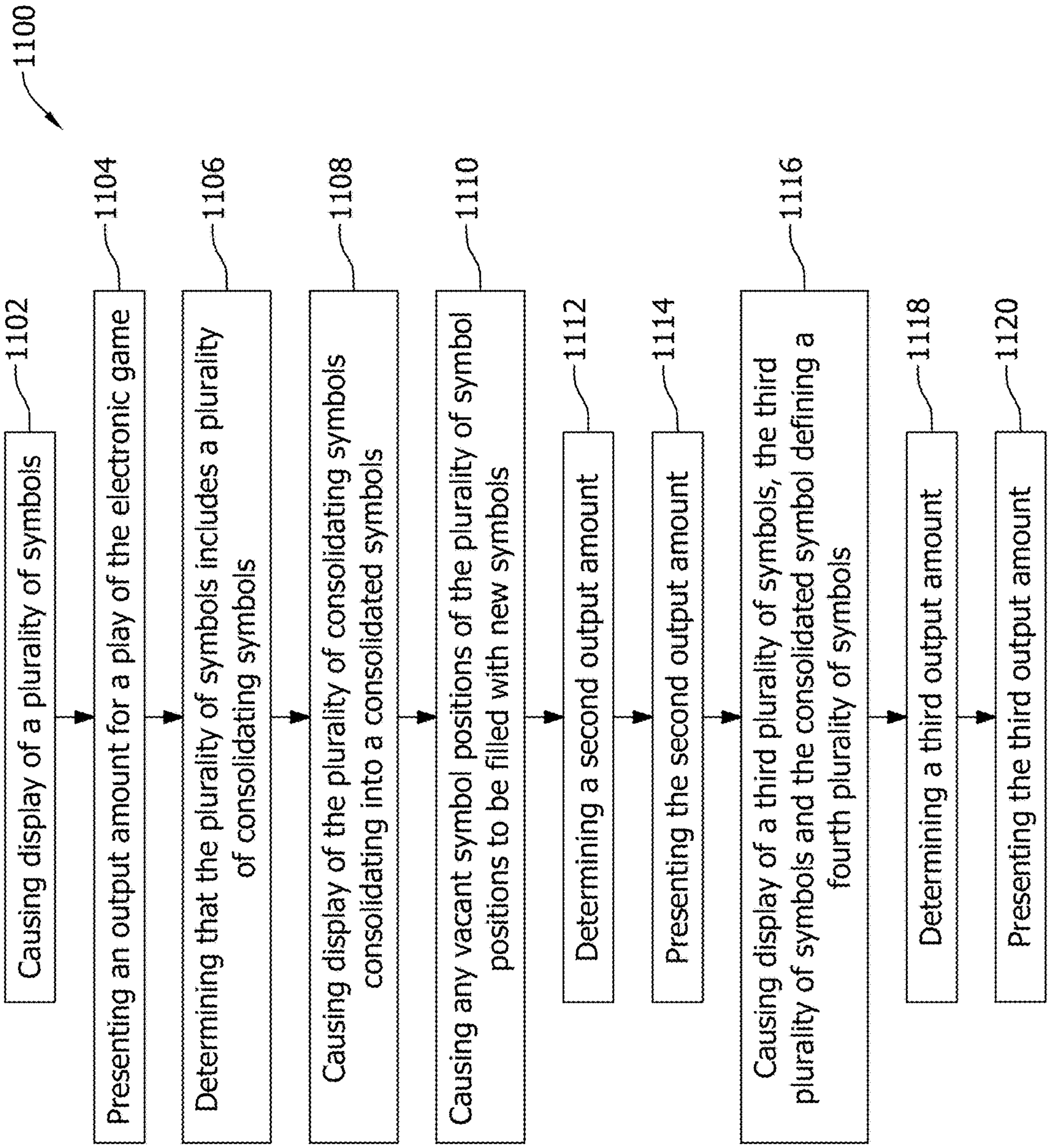
FIG. 11 illustrates an exemplary method of electronic gaming with consolidating symbols, in accordance with the present disclosure.

FIG. 11 illustrates an exemplary method 1100 of electronic gaming with consolidating symbols, in accordance with the present disclosure. In the example embodiment, method 1100 includes causing display 1102 of a plurality of symbols (e.g., 404) at a plurality of symbol positions on a display device wherein the plurality of symbols correspond to an output amount for a play of an electronic game, presenting 1104 the output amount for the play of the electronic game, and determining 1106 that the plurality of symbols includes a plurality of consolidating symbols (e.g., 408A-C).

Method 1100 also includes causing display 1108 of the plurality of consolidating symbols consolidating into a consolidated symbol (e.g., 502) at a symbol position of the plurality of symbol positions previously occupied by a consolidating symbol wherein the consolidated symbol is associated with a number of future plays of the electronic game, causing 1110 any vacant symbol positions of the plurality of symbol positions to be filled with new symbols (e.g., 504-508) wherein the new symbols, the consolidated symbol, and any remaining symbols of the plurality of symbols define a second plurality of symbols, determining 1112 a second output amount for the play of the electronic game based upon the second plurality of symbols, and presenting 1114 the second output amount for the play of the electronic game.

Method 1100 further includes, for each symbol position of the plurality of symbol positions other than the symbol position including the consolidated symbol, causing display 1116 of a third plurality of symbols for one of the number of future plays, the third plurality of symbols and the consolidated symbol defining a fourth plurality of symbols, determining 1118 a third output amount based upon the fourth plurality of symbols, and presenting 1120 the third output amount for the one of the number of future plays.

In some embodiments, method 1100 includes determining that the plurality of symbols includes a plurality of consolidating symbols by determining that the plurality of symbols includes a plurality of Wild symbols wherein the plurality of Wild symbols comprises the plurality of consolidating symbols. In some embodiments, method 1100 includes determining a respective output amount each time a consolidated symbol is consolidated into the consolidated symbol wherein the plurality of consolidating symbols are consolidated into the consolidated symbol one-by-one. In some embodiments, method 1100 includes consolidating the plurality of consolidating symbols into the consolidated symbol one-by-one in an order such that each successive respective output amount is greater than each previous respective output amount.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

a display device;

a memory device storing instructions; and a processor in communication with the display device and the memory device, wherein the instructions, when executed by the processor, cause the processor to:

cause display of a plurality of symbols at a plurality of symbol positions on the display device, wherein the plurality of symbols correspond to an output amount for a play of an electronic game;

present the output amount for the play of the electronic game;

determine that the plurality of symbols includes a plurality of consolidating symbols;

cause display of the plurality of consolidating symbols consolidating into a consolidated symbol at a symbol position of the plurality of symbol positions previously occupied by a consolidating symbol, wherein the consolidated symbol is associated with a number of future plays of the electronic game;

cause display of a counter icon in association with the consolidated symbol, wherein the display of the counter icon includes display of a number of spins associated with the number of future plays;

cause the consolidated symbol to persist at the symbol position across the number of future plays;

fill any vacant symbol positions of the plurality of symbol positions with new symbols, wherein the new symbols, the consolidated symbol, and any remaining symbols of the plurality of symbols comprise a second plurality of symbols;

determine a second output amount for the play of the electronic game based upon the second plurality of symbols;

present the second output amount for the play of the electronic game;

for each symbol position of the plurality of symbol positions other than the symbol position including the consolidated symbol, cause display of a third plurality of symbols for one of the number of future plays, the third plurality of symbols and the consolidated symbol comprising a fourth plurality of symbols;

determine a third output amount based upon the fourth plurality of symbols;

present the third output amount for the one of the number of future plays; and cause the counter icon to decrement the number of spins in response to each future play of the number of future plays.

2. The electronic gaming device of claim 1, wherein the instructions further cause the processor to determine that the plurality of symbols includes a plurality of consolidating symbols by determining that the plurality of symbols includes a plurality of Wild symbols, wherein the plurality of Wild symbols comprises the plurality of consolidating symbols.

3. The electronic gaming device of claim 1, wherein the instructions further cause the processor to determine a respective output amount each time a consolidated symbol is consolidated into the consolidated symbol, wherein the plurality of consolidating symbols are consolidated into the consolidated symbol one-by-one.

4. The electronic gaming device of claim 1, wherein the instructions further cause the processor to consolidate the plurality of consolidating symbols into the consolidated symbol one-by-one in an order such that each successive respective output amount is greater than each previous respective output amount.

5. The electronic gaming device of claim 1, wherein the instructions further cause the processor to only consolidate consolidating symbols that are adjacent another consolidating symbol in the plurality of symbols.

6. The electronic gaming device of claim 1, wherein the instructions further cause the processor to cease display of the consolidated symbol when the number of spins associated with the number of future plays of the electronic game reaches zero.

7. The electronic gaming device of claim 1, wherein the instructions further cause the processor to display an animation in association with the plurality of consolidating symbols consolidating into the consolidated symbol to communicate to a player of the electronic game that consolidation is occurring.

8. The electronic gaming device of claim 1, wherein the instructions further cause the processor to:

cause display of a multiplier associated with the consolidated symbol; and apply the multiplier to each output amount presented by the electronic gaming device while the consolidated symbol is displayed.

9. A non-transitory computer-readable storage medium with instructions stored thereon that, in response to execution by a processor, cause the processor to:

cause display of a plurality of symbols at a plurality of symbol positions on a display device, wherein the plurality of symbols correspond to an output amount for a play of an electronic game;

transmit the output amount for the play of the electronic game;

determine that the plurality of symbols includes a plurality of consolidating symbols;

cause display of the plurality of consolidating symbols consolidating into a consolidated symbol at a symbol position of the plurality of symbol positions previously occupied by a consolidating symbol, wherein the consolidated symbol is associated with a number of future plays of the electronic game;

cause display of a counter icon in association with the consolidated symbol, wherein the display of the counter icon includes display of a number of spins associated with the number of future plays;

cause the consolidated symbol to persist at the symbol position across the number of future plays;

cause any vacant symbol positions of the plurality of symbol positions to be filled with new symbols, wherein the new symbols, the consolidated symbol, and any remaining symbols of the plurality of symbols comprise a second plurality of symbols;

determine a second output amount for the play of the electronic game based upon the second plurality of symbols;

transmit the second output amount for the play of the electronic game;

for each symbol position of the plurality of symbol positions other than the symbol position including the consolidated symbol, cause display of a third plurality of symbols for one of the number of future plays, the third plurality of symbols and the consolidated symbol comprising a fourth plurality of symbols;

determine a third output amount based upon the fourth plurality of symbols;

transmit the third output amount for the one of the number of future plays; and cause the counter icon to decrement the number of spins in response to each future play of the number of future plays.

10. The non-transitory computer-readable storage medium of claim 9, wherein the instructions further cause the processor to determine that the plurality of symbols includes a plurality of consolidating symbols by determining that the plurality of symbols includes a plurality of Wild symbols, wherein the plurality of Wild symbols comprises the plurality of consolidating symbols.

11. The non-transitory computer-readable storage medium of claim 9, wherein the instructions further cause the processor to determine a respective output amount each time a consolidated symbol is consolidated into the consolidated symbol, wherein the plurality of consolidating symbols are consolidated into the consolidated symbol one-by-one.

12. The non-transitory computer-readable storage medium of claim 9, wherein the instructions further cause the processor to consolidate the plurality of consolidating symbols into the consolidated symbol one-by-one in an order such that each successive respective output amount is greater than each previous respective output amount.

13. The non-transitory computer-readable storage medium of claim 9, wherein the instructions further cause the processor to only consolidate consolidating symbols that are adjacent another consolidating symbol in the plurality of symbols.

14. The non-transitory computer-readable storage medium of claim 9, wherein the instructions further cause the processor to cease display of the consolidated symbol when the number of spins associated with the number of future plays of the electronic game reaches zero.

15. The non-transitory computer-readable storage medium of claim 9, wherein the instructions further cause the processor to display an animation in association with the plurality of consolidating symbols consolidating into the consolidated symbol to communicate to a player of the electronic game that consolidation is occurring.

16. The non-transitory computer-readable storage medium of claim 9, wherein the instructions further cause the processor to:

cause display of a multiplier associated with the consolidated symbol; and apply the multiplier to each output amount presented while the consolidated symbol is displayed.

17. A method of electronic gaming implemented by a processor in communication with a memory, the method comprising:

causing display of a plurality of symbols at a plurality of symbol positions on a display device, wherein the plurality of symbols correspond to an output amount for a play of an electronic game;

presenting the output amount for the play of the electronic game;

determining that the plurality of symbols includes a plurality of consolidating symbols;

causing display of the plurality of consolidating symbols consolidating into a consolidated symbol at a symbol position of the plurality of symbol positions previously occupied by a consolidating symbol, wherein the consolidated symbol is associated with a number of future plays of the electronic game;

causing display of a counter icon in association with the consolidated symbol, wherein the display of the counter icon includes display of a number of spins associated with the number of future plays;

causing the consolidated symbol to persist at the symbol position across the number of future plays;

causing any vacant symbol positions of the plurality of symbol positions to be filled with new symbols, wherein the new symbols, the consolidated symbol, and any remaining symbols of the plurality of symbols comprise a second plurality of symbols;

determining a second output amount for the play of the electronic game based upon the second plurality of symbols;

presenting the second output amount for the play of the electronic game;

for each symbol position of the plurality of symbol positions other than the symbol position including the consolidated symbol, causing display of a third plurality of symbols for one of the number of future plays, the third plurality of symbols and the consolidated symbol comprising a fourth plurality of symbols;

determining a third output amount based upon the fourth plurality of symbols;

presenting the third output amount for the one of the number of future plays; and causing the counter icon to decrement the number of spins in response to each future play of the number of future plays.

18. The method of claim 17, further comprising determining that the plurality of symbols includes a plurality of consolidating symbols by determining that the plurality of symbols includes a plurality of Wild symbols, wherein the plurality of Wild symbols comprises the plurality of consolidating symbols.

19. The method of claim 17, further comprising determining a respective output amount each time a consolidated symbol is consolidated into the consolidated symbol, wherein the plurality of consolidating symbols are consolidated into the consolidated symbol one-by-one.

20. The method of claim 17, further comprising consolidating the plurality of consolidating symbols into the consolidated symbol one-by-one in an order such that each successive respective output amount is greater than each previous respective output amount.

* * * * *